United States Patent
Ray et al.

(10) Patent No.: US 12,405,339 B2
(45) Date of Patent: Sep. 2, 2025

(54) SYSTEMS, METHODS, AND APPARATUS FOR PROCESSING HIGH FREQUENCY SIGNALS

(71) Applicant: The Boeing Company, Chicago, IL (US)

(72) Inventors: Gary A. Ray, Chicago, IL (US); Tai A. Lam, Chicago, IL (US); Alec Adams, Chicago, IL (US)

(73) Assignee: The Boeing Company, Arlington, VA (US)

( * ) Notice: Subject to any disclaimer, the term of this patent is extended or adjusted under 35 U.S.C. 154(b) by 316 days.

(21) Appl. No.: 17/942,042

(22) Filed: Sep. 9, 2022

(65) Prior Publication Data
US 2024/0094324 A1 Mar. 21, 2024

(51) Int. Cl.
*G01S 3/46* (2006.01)
(52) U.S. Cl.
CPC ..................... *G01S 3/46* (2013.01)
(58) Field of Classification Search
None
See application file for complete search history.

(56) References Cited

U.S. PATENT DOCUMENTS

| | | | | |
|---|---|---|---|---|
| 2003/0190897 A1* | 10/2003 | Lei | ......... | H04B 7/0695 455/101 |
| 2010/0008268 A1* | 1/2010 | Whinnett | ......... | H04B 7/086 455/562.1 |
| 2010/0232528 A1* | 9/2010 | Li | ......... | H04B 7/0639 375/260 |
| 2012/0230380 A1* | 9/2012 | Keusgen | ......... | H04B 7/0482 375/227 |

\* cited by examiner

*Primary Examiner* — Whitney Moore
(74) *Attorney, Agent, or Firm* — Harrity & Harrity, LLP

(57) ABSTRACT

Systems, methods, and apparatus for processing a signal using a non-uniform antenna array are disclosed. In one aspect, a receiver apparatus for processing high frequency signals is provided. The receiver apparatus may comprise an antenna array including a plurality of antenna elements. The plurality of antenna elements may include a first antenna element and a remainder of the plurality of antenna elements. The remainder of the plurality of antenna elements may be uniformly spaced apart from one another by a first distance and arranged in a substantially linear orientation. The remainder of the plurality of antenna elements may include a second antenna element spaced apart from the first antenna element by a second distance. The second distance may be different than the first distance.

20 Claims, 5 Drawing Sheets

SYSTEMS, METHODS, AND APPARATUS FOR PROCESSING HIGH FREQUENCY SIGNALS

FIELD

The present disclosure relates to antenna arrays, and more particularly, to non-uniform antenna arrays for processing high frequency signals.

BACKGROUND

This background description is provided for the purpose of generally presenting the context of the disclosure. Unless otherwise indicated herein, material described in this section is neither expressly nor impliedly admitted to be prior art to the present disclosure or the appended claims.

As the applications for higher frequency signals increases in areas such as biomedical imaging, automotive anti-collision radars, electronic warfare, and communications, the desire for antenna arrays supporting these applications is also increasing. Antenna arrays may allow greater antenna gain and directionality for many different applications, including estimating angle (or direction) of arrival of incoming signals. To meet these higher frequency applications, improved antenna arrays are needed to handle the problems inherent in the design of uniform linear antenna arrays for these applications. For example, each antenna element of a uniform linear antenna array may need to have an electronic backend as near as possible to the antenna element for amplification, conditioning, phase matching, calibration, and phase control. However, the spacing requirements between the antenna elements of uniform linear antenna arrays tend to be much larger than the maximum spacing allowed for higher frequency applications. These spacing requirements are driven by the requirement to eliminate grating lobes which may cause ambiguities in the angle of arrival.

To eliminate or reduce the ambiguities in the angle of arrival, uniform linear antenna arrays are typically designed to have less than (<) $\lambda/2$ spacing between antenna elements (called Nyquist spacing) to receive radio frequency (RF) signals with wavelengths $\lambda$. For example, a 10 GHz frequency signal has a wavelength of 3 cm and a 100 GHz frequency signal has a wavelength of 3 mm. These spacing requirements may place physical constraints on uniform linear antenna array designs and antenna signal processing, especially for digital antenna arrays. As such, the width of uniform linear antenna arrays may be too small to accommodate the number of antenna elements required for reducing or eliminating grating lobes and for estimating angle of arrival efficiently. Thus, there is a need for a solution for a high frequency antenna array with reduced complexity that employs fewer antenna elements and wider spacing between the antenna elements, while preserving unambiguous angle of arrival estimation.

SUMMARY

The present application discloses systems, methods, and apparatus for processing signals using antenna arrays having non-uniform spacing between antenna elements (e.g., non-uniform antenna arrays). The design of the antenna arrays allows for wider spacing (e.g., multiple wavelength spacing) between the antenna elements than required by traditional $\lambda/2$ spacing requirements, while preserving the unambiguous phase range necessary for array processing. As such, the antenna arrays may be constructed with fewer antenna elements, larger antenna elements, and/or smaller array lengths than uniform linear antenna arrays while continuing to meet similar overall performance goals. Further, the antenna arrays provide more accurate angle of arrival (AOA) information and may magnify the unambiguous phase range of the antenna array compared to other uniform linear antenna arrays. Thus, the antenna arrays allow for a substantially wider bandwidth with unambiguous angle of arrival (AOA) estimation and may be used for wide-band direction-finding applications.

The design of the antenna arrays allows for trade-offs between array gain and grating lobe formation that allow for substantially smaller array lengths to be used for unambiguous AOA estimation. The antenna arrays may be configured to receive and process waveforms that have both low probability of detection (LPD) and anti jam characteristics. For example, in some embodiments, the antenna arrays may use Rydberg sensors for precise angle of arrival estimation across a frequency range. Further, the antenna arrays provide increased gain and direction accuracy than uniform linear antenna arrays with the same number of elements. As such, the antenna arrays may enable complex beam forming applications to be used at higher frequencies than uniform antenna arrays.

The antenna arrays may be configured to have nearly uniform spacing between substantially all of the antenna elements to allow for a simple design and to reduce manufacturing and testing complexity. For example, the spacing between the antenna elements may be the same except for one pair of elements, thus creating an almost uniform array. Further, the minimum spacing of the array elements may be independent of the wavelength to allow the array design to be tailored to the electronics and board design of the receiver systems. The features of the antenna arrays can provide many benefits for applications such as communication, biomedical imaging, automotive anti-collision radar, and electronic warfare.

In one aspect, a receiver apparatus for processing high frequency signals is provided. The receiver apparatus may comprise an antenna array including a plurality of antenna elements. The plurality of antenna elements may include a first antenna element and a remainder of the plurality of antenna elements. The remainder of the plurality of antenna elements may be uniformly spaced apart from one another by a first distance and arranged in a substantially linear orientation. The remainder of the plurality of antenna elements may include a second antenna element spaced apart from the first antenna element by a second distance. The second distance may be different than the first distance.

In another aspect, a method for processing high frequency signals is provided. The method may include receiving an incoming signal at a receiver system, wherein the receiver system includes an array of antenna elements and a receiver associated with each antenna element, and wherein the antenna elements are linearly and non-uniformly arranged. The method may also include determining a received signal vector based on signals output from each of the antenna elements of the array and determining a manifold matrix, wherein the manifold matrix is based on a spacing vector representing positions of the antenna elements of the antenna array. Further, the method may include determining a phase estimate vector by applying the manifold matrix to values of the received signal vector, and estimating an angle of arrival of the incoming signal based on the phase estimate vector and phases of complex input parameters.

In a further aspect, a method of constructing an antenna array is provided. The method may include selecting a number of antenna elements for the antenna array, determining one or more antenna parameters of the antenna array, and determining a differential spacing vector representing spacing between the antenna elements of the antenna array based the number of antenna elements and the one or more antenna parameters. The method may also include determining an element spacing vector representing locations of the antenna elements, generating a list of manifold matrices wherein the manifold matrix is based on a differential spacing vector representing spacing between the antenna elements of the antenna array, computing a variance value for each manifold matrix, and outputting the spacing vector (v) based on a comparison of the variance value to a threshold value.

The features, functions, and advantages can be achieved independently in various embodiments of the present application or may be combined in yet other embodiments.

BRIEF DESCRIPTION OF THE DRAWINGS

These and other features, aspects, and advantages of the embodiments of the present application will become more apparent with reference to the following description, appended claims, and accompanying drawings where:

DETAILED DESCRIPTION

Figure 1:
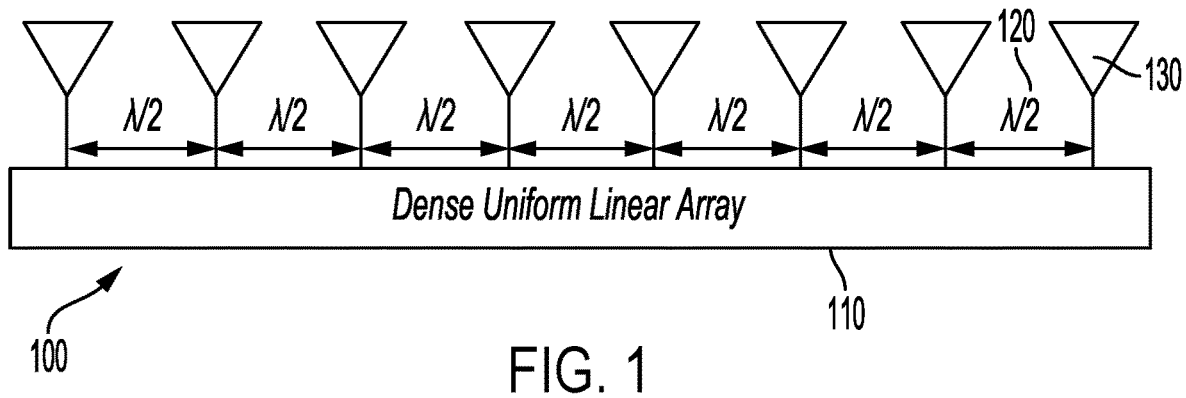
FIG. 1 is a simplified block diagram illustrating a uniform antenna array with uniform spacing between the antenna elements.

The advantages and features of the systems, methods, and apparatus of the present application will become apparent from exemplary embodiments described below in detail with reference to the accompanying drawings. The exemplary embodiments described in the detailed description, figures, and claims are not meant to be limiting. Other embodiments may be utilized, and other changes may be made, without departing from the scope of the subject matter presented herein. It will be readily understood that the aspects of the present application, as generally described herein, and illustrated in the figures, can be arranged, substituted, combined, separated, and designed in a wide variety of different configurations, all of which are explicitly contemplated herein.

For the sake of brevity, conventional techniques and components related to antenna arrays, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in embodiments of the present application.

The present application discloses systems, methods, and apparatus to overcome the drawbacks of estimating angle of arrival (AOA) using uniform linear array antennas. For example, direction finding applications using uniform linear antenna arrays usually require multiple antenna arrays with different element spacing to avoid or reduce grating lobes. These applications may involve multiple array designs efforts with much more physical space necessary for mounting and using uniform linear antenna arrays. As such, uniform linear antenna arrays may not be optimal solution for AOA estimation of high frequency signals since physical space is at a premium on most communication platforms (e.g., airborne platforms), as well as most other applications.

The systems, methods, and apparatus of the present application receive and process signals using antenna arrays having non-uniform spacing between the antenna elements (e.g., a non-uniform antenna array). The design of the antenna arrays allows for wider spacing (e.g., multiple wavelength spacing) between the antenna elements than required by traditional $\lambda/2$ spacing requirements, while preserving the unambiguous phase range necessary for array processing. As such, the antenna arrays may be constructed with fewer antenna elements, larger antenna elements, and/or smaller length arrays than uniform linear antenna arrays while continuing to meet similar overall performance goals. Further, the antenna arrays provide more accurate angle of arrival (AOA) information and magnify the unambiguous phase range of the antenna array compared to other uniform linear antenna arrays. Thus, the antenna arrays allow for a substantially wider bandwidth with unambiguous angle of arrival (AOA) estimation and may be used for wide-band direction-finding applications.

The design of the antenna arrays may allow for trade-offs between array gain and grating lobe formation that allow for substantially smaller array lengths to be used for unambiguous AOA estimation. The antenna arrays may be configured to receive and process waveforms that have both low probability of detection (LPD) and anti jam characteristics. For example, in some embodiments, the antenna arrays may use Rydberg sensors for precise angle of arrival estimation across a frequency range. Further, the antenna arrays provide increased gain and direction accuracy than uniform linear antenna arrays with the same number of elements. As such, the antenna arrays may enable complex beam forming applications to be used at higher frequencies than uniform antenna arrays.

The antenna arrays may be configured to have nearly uniform spacing between substantially all of the antenna elements to allow for a simple design and to reduce manufacturing and testing complexity. For example, the spacing between two antenna elements may only be different than the spacing between the other antenna elements of the antenna array. Further, the minimum spacing of the array elements may be independent of the wavelength to allow the array designs be tailored to the electronics and board design of the receiver systems. The features of the antenna array can provide many benefits for applications such as communication, biomedical imaging, automotive anti-collision radar, and electronic warfare.

Conventionally, uniform linear antenna arrays may be designed based on array thinning, using random methods, using mathematical constructs, or using combinations of these approaches. These are described briefly below. For array thinning and random methods, a large uniformly spaced array (either linear or planar) may be used as a starting point. Large arrays may be heavier and complex to build, including having increased fabrication and setup costs, etc. Therefore, eliminating antenna elements from the antenna array may be desirable, particularly if the performance of the antenna array is not significantly degraded. One method of achieving this goal is array thinning, which involves systematically removing antenna elements without a large degradation in performance. The antenna elements may then be perturbing (i.e. adjusted) from their locations if necessary.

Array thinning may reduce the number of antenna elements and, hence, may reduce the peak gain of the array. The goal is to keep the array gain, side lobes, and beam width acceptable during the thinning process. In addition, the level of the side lobes and beam width may also be degraded, but the thinning process may try to keep these array properties acceptable. Typically, the performance of a full uniform array can be approximately achieved using forty percent (40%) fewer elements. There are a number of techniques to design thinned arrays. These techniques may include: (1) thinning based on empirical or analytical formula, (2) thinning based on space or density tapering, (3) statistically thinned arrays, and (4) optimizing algorithms. These techniques used to design thinned arrays are described below.

For empirical or analytical formula thinning techniques, array thinning may be performed by using an analytic formula or mathematical construct, which may be advantageous because it may not require extensive trial and error computation. For example, antenna array spacing can be designed to follow a prime number sequence, which leads to a non-uniform and sparse spacing such as provided in the formula: $d=[2\lambda/2, 3\lambda/2, 5\lambda/2, 7\lambda/2, 11\lambda/2, \ldots]$. This type of array may be used for extending ranging estimates. While it may have a superficial similarity to the antenna array disclosed in this patent application, the antenna arrays described below may be much different in character and usage.

For space or density tapering thinning techniques, one method of lowering side lobes in antenna arrays is to decrease the magnitude of the weights away from the center of the array. This tapering is similar to "windowing" in digital signal processing. Having a uniform weight set across the antenna array may lead to higher side lobes than when the weights taper down. The density tapering approach uses uniform weights for all antennas; however, it removes antenna elements away from the center, in effect having less energy radiated away from the center of the array, which accomplishes the same effect as described above.

For statistically array thinning techniques, a statistical method is often used for array tapering for very large arrays. In this approach, the probability for an antenna element to lie in a particular position is proportional to the desired weighting for a weight-tapered array. For antenna arrays with a large number of antenna elements, this approach may yield antenna arrays that behave properly and have low side lobes.

For optimized thinning techniques, thinning and placement optimization is often done via optimization algorithms. The optimization algorithms may include: Genetic Algorithms (GA), the Particle Swarm Optimization (PSO) algorithm, and Simulated Annealing (SA). All of these techniques employ some statistical optimization approach that guesses at the proper elements to remove, then removes them if this increases the performance of the array.

When using mathematical constructs to design antenna arrays, array spacing design can be performed by using an analytic formula or mathematical construct, which may be advantageous because it may not require extensive trial and error computation. Two examples may include a prime number sequence array and a congruent non-uniform linear array. For a prime number sequence array, array spacing may be designed to follow a prime number sequence, which leads to a non-uniform and sparse spacing such as given in the formula below:

$$d = \left[ \frac{2\lambda}{2}, \frac{3\lambda}{2}, \frac{5\lambda}{2}, \frac{7\lambda}{2}, \frac{11\lambda}{2}, \ldots \right].$$

This type of array can be used for extending ranging estimates.

For congruent non-uniform linear arrays, the spacing of a congruent array is defined by a length n coprime moduli set which may be denoted by $\{p_i\}_{i=1, 2, \ldots, n}$. The spacing of the congruent array is defined by a design wavelength $\lambda_d$ with pairwise element distances in the set $\{\lambda_d/p_1, \lambda_d/p_2, \ldots, \lambda_d/p_n\}$. The choice of $\lambda_d$ is made during the array design process and the actual antenna element locations are chosen so that these pairwise distances are covered. One placement method is to use n+1 antenna elements arranged in a line with differences in position as given, but any other suitable method of placement can be chosen. This implies that while there are n pair distances for a congruent array, there can be more or less than n+1 elements. This also implies that planar and more general array types can be created. The phase differences of a signal are measured by the congruent array to produce a set of phase differences $\{s_i\}$.

All of the above-described methods employ some statistical optimization approach that guesses at the proper antenna elements to remove, then removes them if the performance of the array is increased. The concept of array thinning has been popular in the antenna literature, primarily because it is simple to implement and can achieve interesting results.

By contrast, the present application discloses the design of non-uniform arrays with unambiguous differential phase estimate using a controlled design process as further described below. The non-uniform arrays may be designed with as few as one different spacing between antenna elements instead of many different spacing as previous techniques require. In some embodiments, the non-uniform array may be designed with different spacing between two or more antenna elements.

The antenna arrays of the present application may be designed to receive and process waveforms that have both low probability of detection (LPD) and anti jam characteristics. For example, the antenna arrays of the present application may be implemented using quantum receiver technologies such as a Rydberg receiver or antenna system. To design a waveform with both low probability of detection (LPD) and anti jam characteristics, the design for the waveform may begin with a basic time-frequency spreading Rydberg waveform. The waveform may then be extended to enhance its LPD and anti jam performance. For a time-frequency spreading Rydberg waveform design, let $\{n_i\}_{i=0, \ldots, N-1}$ be the quantum numbers and $\{f\}_{i=0, \ldots, N-1}$ be corresponding center frequencies together with the corresponding bandwidths $\{b_i\}_{i=0, \ldots, N-1}$. Assuming for simplicity that these bandwidths may be the same (namely B), then chip period $$T = \frac{1}{B}$$

is used and QPSK (or any other desirable modulation) chips are specified at times $\{t_i\}$, where timeslot i has time $t_i=iT$. In one example, assuming for simplicity that $B=b_i=10$ MHz and the symbol rate is $T=1/B$, the QPSK transmitted symbols may use M chips encoded with the transmitted symbol and the Rydberg receiver correlates with the known chip sequence to recover the transmitted symbol.

Assuming the maximum scan rate of a Rydberg receiver may at least allow reliable symbol reception at the symbol rate and more specifically $J_i \geq 1$ times faster, meeting the scan rate program metric for all frequencies with a 10 MHz bandwidth per quantum number will essentially mean that $J_i=1$. The maximum scanning rate of the receiver may be achieved using consecutive rather than random frequencies due to the physical implementation of a laser or other detection method. Thus, the Rydberg receiver is assumed to sweep up and down across the entire frequency range (N steps each way) with M chips per symbol. The correlation chips for the $k^{th}$ transmitted symbol $Q_k$ will be $\{q_{tj}\}_{j=1, \ldots, J}$ at each time t and frequency $f_t$, which if it is assumed $J=1$ and changing chips are allowed every symbol, this would give the sequence $\{q_i(k)\}_{i=I, \ldots, I+M-1}$ starting at timeslot I. Letting $\{W_i\}$ be the sensitivity of the Rydberg receiver at quantum number $n_i$ and setting the amplitude of each symbol to $w_i=W_i/M$, the basic transmitted waveform (starting at t=0 and ending t=N with chips that change every period T) is $$s_k(t) = \sum_{i=I}^{N-1} w_i q_i(k) \Pi\left(t - iT - \frac{1}{2}\right)$$

where $\Pi(t)$ is the standard boxcar function. Note that signals below 1 GHz have a noise environment that also depends on external noise rather than just thermal/receiver sensitivity noise limit; it includes man-made, atmospheric, and galactic noise of different levels at different frequencies.

After reception and I/Q sampling at the correct time (assuming time synchronization has occurred between transmitter and receiver), the waveform is proportional to:

$$r_k(t) = \sum_{i=I}^{N-1} \left(\frac{q_i(k)}{N}\right) \delta(t - iT - 1)$$

(using the Dirac comb notation) where it is assumed the Rydberg receiver produces both phase and amplitude. The receiver may correlate with the known but secret sequence:

$$c_k(t) = \sum_{i=I}^{I+M-1} (q_i^*(k)) \delta(t - iT - 1)$$

to produce a value of M. This is the correlation gain of a single symbol that may be designed to transmit over distance to the intended receiver.

The final transmitted signal at each time period kM, k=0, 1, . . . of symbol $Q_k$ beginning at frequency step I, where k is even, then:

$$s_k(t) = Q_k \sum_{i=I}^{N-1} w_i q_i(k) \Pi\left(t + kM - iT - \frac{1}{2}\right)$$

and when k is odd:

$$s_k(t) = Q_k \sum_{i=I}^{N-1} W_{M+I-i-1} q_i(k) \Pi\left(t + kM - iT - \frac{1}{2}\right).$$

Note that there may be transmit and receive filters convolved with these signals that would represent the actual waveform since these would be necessary to control spectrum. These are typically square root raised cosine filters and are not shown. They would be correlated in the Rydberg receiver within the $k^{th}$ time interval $t \in [(k-1)NT, kNT]$ using: where k is even:

$$c_k(t) = \sum_{i=I}^{N-1} (q_i^*(k)) \delta(t - iT - 1)$$

and where k is odd:

$$c_k(t) = \sum_{i=I}^{N-1} (q_{N-i-1}^*(k)) \delta(t - iT - 1)$$

This allows for control over the scan rate of the Rydberg receiver to not exceed its continuous specification of 10 quantum numbers per microsecond (or roughly 100 MHz/ms) by scanning forward and backward in frequency across the N quantum frequency steps as k varies from even to odd. This then produces a sequence $\{Q_k\}$ after correlation and thus the LPD communications channel has a symbol period of NT with chip period of T and transmits 2=NT bits per second. With B=10 MHz, N=100, and a constant sensitivity figure across this frequency range of W=−154 dbI=Hz, this gives a 200 Kbps bit rate operating at the thermal noise limit of −174 dbm=Hz. Thus, a reasonable LPD goal is achieved of operating at the thermal noise limit for the Rydberg waveform.

Using the spreading waveform described above, the design may involve waveform frequency coverage across the entire NB bandwidth, signal levels ($w_i$) at the thermal noise limit of −174 dbm (>1 GHz), and no exploitable peak frequency levels across signal frequency range. This would give a theoretical data rate of 200 Kbps, with data rate dropping as the range increases. However, operating at the noise floor is not sufficient for true LPD performance since an adversary receiver can compute signal power per time slot over time and reliably conclude that a transmission is occurring without being able to decode it.

While stenographic techniques imply that for LPD, only $O(\sqrt{n})$ bits can be sent over n channels. A more effective and practical result implies that using an uninformed jammer that varies power levels randomly will allow $O(n)$ bits to be sent using the assumption of a noise level range. To make this result practical, chip symbols may be used with adjusted $w_i$ as both the jammer and the transmitted signal. In this case, the levels of the jammer chips may vary randomly at a fraction of the thermal noise limit (for >1 GHz) and the signal chips would be at a fixed proportion of the thermal noise limit to achieve the actual correlation gain.

A shared secret between receiver and transmitter would allow the receiver to know which timeslots to correlate. This approach prevents the adversary from determining the presence of a signal. Note that the quantum frequencies of the Rydberg receiver may cover from 10 MHz to 40 GHz and so the many frequencies below 1 GHz may have various levels of man-made, atmospheric, and galactic noise in addition to thermal noise. Thus, setting the signal levels would require taking these noise sources into account at the different frequencies.

Finally, the LPD performance may be increased by operating multiple coherent/incoherent Rydberg frequency transmissions within the transmitter or array of transmitters together with a receiver (or array of receivers) that scans multiple frequencies at one time to provide either lower spectral power or increased data rate or both. By using P quantum frequencies at one time, this essentially increases the instantaneous bandwidth from B to PB and allows different system options to be traded off in multiple ways, either through faster symbol times or parallel channels or even further reductions in signal power. This trade-off also depends on whether the signal is transmitted coherently across the different quantum frequencies.

For designing a LPD waveform with anti jam ability, the LPD waveform described above may be modified. Typically, two types of jammers, broadband and narrowband, are of concern. The broadband jammers typically raise the noise level across the communications spectrum and are thus overcome by further signal spreading and coding gain, while the narrowband jammers knock out specific frequencies and may be overcome with redundancy/avoidance.

In the case of a Rydberg based waveform, the narrow band jammer has a bigger advantage than normal since the frequencies are known. Assuming that enough quantum frequencies (N quantum states with bandwidth B per state or NB) are occupied for the LPD waveform so that it may be difficult or impossible for the jammer to fill this bandwidth all the time with enough energy to disable communications, the jammer must selectively target portions using its dynamic jamming strategy. Since it is assumed that fast receive scanning is not random but sequential for the Rydberg receiver, frequency avoidance (the transmitter may have the advantage in this case) may not be used. Instead, an error correction strategy may be used on top of the LPD waveform that was described above.

A block code approach may be used since it may have no memory and may immediately correct bits whenever the jamming changes which "bits" are being corrupted. Note that the anti jamming codes that are introduced can directly replace and/or extend any normal error correction required for a non-jammed Rydberg communications system. Assuming N quantum receiver states are used, this may be allocated as a symbol with Q bits per symbol (QPSK would have 2 bits/symbol). A block code may be created that transforms K symbols into N symbols each with Q bits (typically Q is the rank of a finite field in the case of Reed-Solomon error correction) with the ability to correct (N−K)/2 errors. Thus, the design reduces the information symbol count K down to the point where a jammer has the limitation of jamming no more than H<N/2 frequencies at a symbol rate, ranges involved and power levels of the jammer, wherein K=N−2H. This provides jamming protection at the expense of a reduced communications rate.

The statistical accuracy of estimating the angle or arrival (AOA) of these waveforms may be limited when using uniform linear antenna arrays (e.g., Ryberg ULA array). FIG. 1 illustrates a block diagram 100 of an exemplary uniform linear antenna array 110 with uniform spacing 120 (i.e. $\lambda/2$) between the antenna elements 130. For a uniform linear antenna array of N elements with spacing $\lambda/2$, the AOA estimate $\hat{\varphi}$ of an incoming signal with a given signal to noise ratio (SNR) from the angle $\varphi$ has a limit to its statistical accuracy as determined by the Cramer-Rao lower bound (CRLB) on the variance of any unbiased estimator:

$$\text{var}(\hat{\phi}) \geq \frac{6}{(SNR)N(N^2-1)(2\pi d)^2 \cos(\phi)^2}$$

Figure 2:
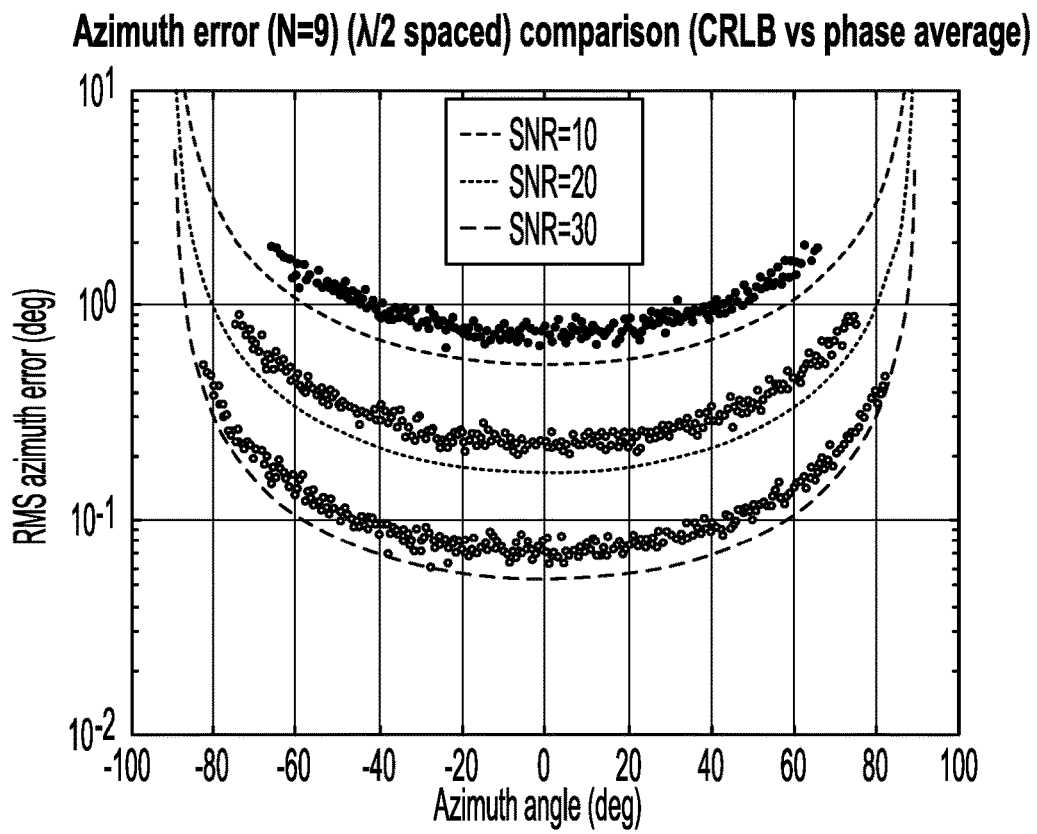
FIG. 2 is a graph of a simulation result for the arrival angle estimation of a signal using a uniform antenna array.

Note that 0 is chosen as the boresight angle for the uniform linear antenna array and therefore the incoming angle satisfies $-\pi/2 < \varphi < \pi/2$. As shown in FIG. 2, this lower bound is illustrated using N=9, $\lambda/2$ (Nyquist) spacing (d=½) with several signal to noise ratio (SNR) values (10 db, 20 db, 30 db) over this azimuth AOA range with the solid lines. This bound is for any unbiased estimator. If a simple but slightly suboptimal estimation method is used to compute AOA (called phase averaging) and a number of simulations are run under the same conditions as the bound, FIG. 2 shows in dots when the error lands. Thus, the bounds and the phase average method show proper agreement. Note that the equation above is in radians and refers to the variance of the estimator. FIG. 2 shows the standard deviation in degrees, which is computed via the equations as follows:

$$180\sqrt{\text{var}(\hat{\varphi})}/\pi.$$

The present application discloses systems, methods, and apparatus to overcome the drawbacks of estimating angle of arrival (AOA) of high frequency signals (e.g., RF signals) using uniform linear array antennas. For example, array applications for estimating AOA using uniform linear antenna arrays usually require multiple antenna arrays with different element spacing to reduce or eliminate grating lobes. Further, these applications may involve multiple array designs efforts with much more physical space necessary for mounting and using these uniform linear antenna arrays. As such, uniform linear antenna arrays may not be optimal solutions for AOA estimation for high frequency signals since physical space is at a premium on most communication platforms (e.g., airborne platforms), as well as most other applications.

The systems, methods, and apparatus of the present application receive and process signals using antenna arrays having non-uniform spacing between the antenna elements (e.g., non-uniform antenna arrays). The design of the antenna arrays allows for wider spacing (e.g., multiple wavelength spacing) between the antenna elements than required by traditional $\lambda/2$ spacing requirements, while preserving the unambiguous phase range necessary for array processing. As such, the antenna arrays may be constructed with fewer antenna elements, larger antenna elements, and/or smaller array lengths than uniform linear antenna arrays while continuing to meet similar overall performance goals. Further, the antenna arrays provide more accurate angle of arrival (AOA) information and magnify the unambiguous phase range of the antenna array compare to other uniform linear antenna arrays. Thus, the antenna arrays allow for a substantially wider bandwidth with unambiguous angle of arrival (AOA) estimation and may be used for wide-band direction-finding applications.

The design of the antenna arrays may allow for trade-offs between array gain and grating lobe formation that allows for substantially smaller array lengths to be used for unambiguous AOA estimation. The antenna arrays may be configured to receive and process waveforms that have both low probability of detection (LPD) and anti jam characteristics. For example, in some embodiments, the antenna arrays may use Rydberg sensors for precise angle of arrival estimation across a frequency range. Further, the antenna arrays may provide increased gain and direction accuracy than uniform linear antenna arrays with the same number of elements. As such, the antenna arrays may enable complex beam forming applications to be used at higher frequencies than uniform antenna arrays.

The antenna arrays may include nearly uniform spacing between substantially all of the antenna elements to allow for a simple design and to reduce manufacturing and testing complexity. For example, the spacing between two antenna elements may only be different than the spacing between the other antenna elements of the antenna array. Further, the minimum spacing of the array elements may be independent of the wavelength to allow the array design to be tailored to the electronics and board design of the receiver systems. The features of the antenna arrays can provide many benefits for applications such as communication, biomedical imaging, automotive anti-collision radars, and electronic warfare.

Figure 3:
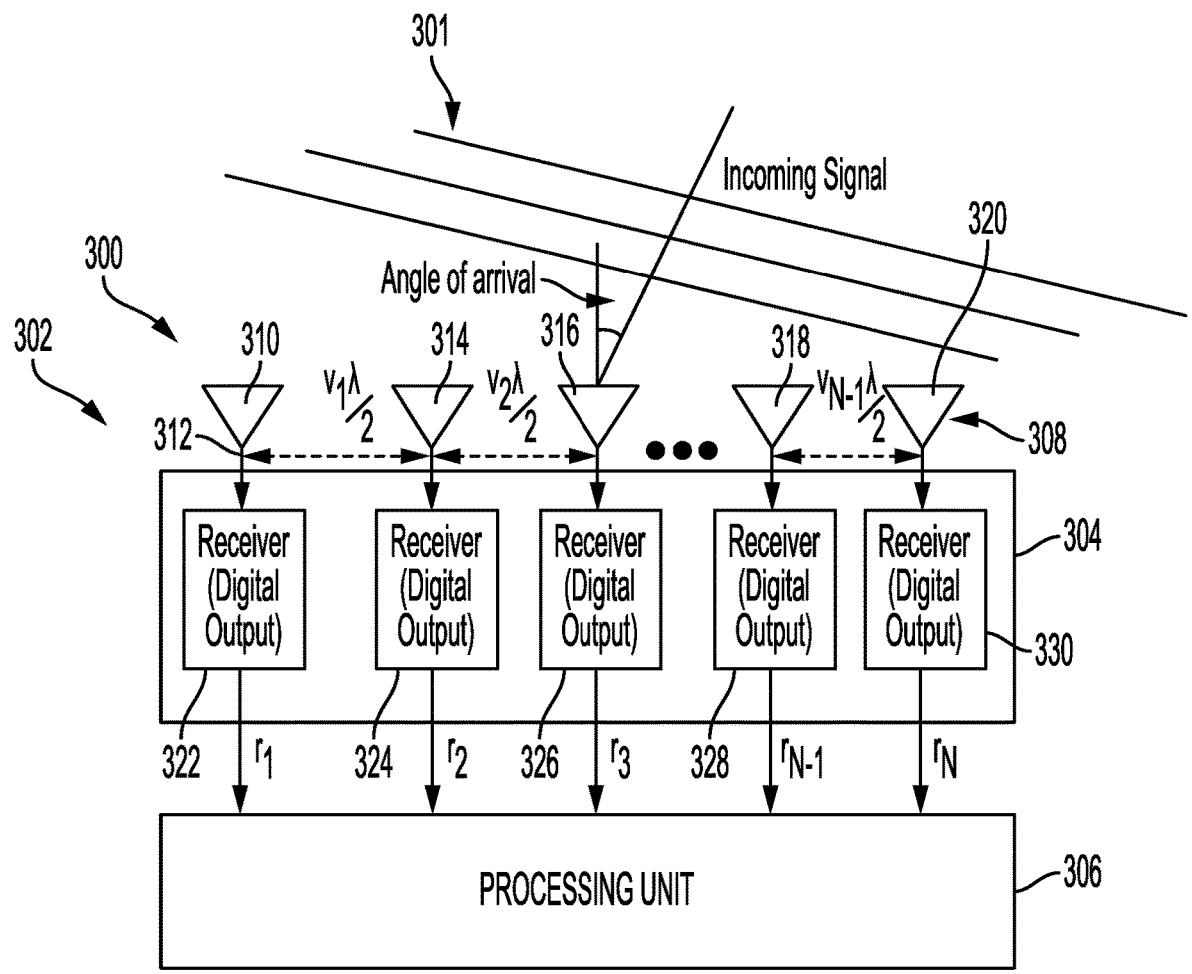
FIG. 3 is a simplified block diagram illustrating an antenna apparatus having non-uniform spacing between the antenna elements, according to an example embodiment.

FIG. 3 illustrates a receiver apparatus or receiver system 300 for processing signals, in accordance with an exemplary implementation. The receiver system 300 may receive incoming signal 301 and may estimate unambiguous angles of arrival (AOA) of the incoming or received signals. The receiver system may be designed to receive and process radio communication (RF) signals. In some embodiments, the receiver system 300 may be designed to receive and process signals or waveforms that have both low probability of detection (LPD) and anti jam characteristics.

As shown in FIG. 3, the receiver system 300 includes an antenna array 302, a receiver unit 304, and a processing module or processing unit 306. In one or more embodiments, the antenna array 302 may be a linear or planar array. The antenna array 302 has a plurality of antenna elements 308 having non-uniform spacing between the antenna elements 308. The antenna elements 308 may be configured as receive elements, transmit elements, or transmit and receive elements.

Each of the plurality of antenna elements 308 may receive the incoming signal 301 and provide an antenna output signal corresponding to the incoming signal 301 received by each of the respective antenna elements. Each antenna element of the antenna array 302 may detect or receive a phase difference related to the angle of arrival of the incoming signal 301. The antenna output signals output from the antenna elements 308 may be digital signals. The phase difference of the incoming signal 301 at each antenna element may be measured by the receiver unit 304 to produce a set of phase differences $\{s_i\}$ as further described below.

The antenna array 302 of the receiver system 300 may include a first antenna element 310 for receiving an incoming signal 301 and for providing an antenna output signal 312 corresponding to the incoming signal 301 received by the first antenna element 310. The antenna array 302 may also include a plurality of antennas elements 314-320 spaced apart from each other by a first distance. The antenna element 314 of the plurality of antennas elements 314-320 may be spaced at a second distance from the first antenna element 310 of the antenna array 302. In some embodiments, the antenna array 302 may include multiple antenna elements arranged in a substantially linear orientation. The multiple antenna elements may include a first plurality of antenna elements spaced apart by a first distance and a second plurality of antenna element spaced apart by a second distance. The first plurality of antenna elements may be spaced from the second plurality of antenna element by the first or second distance.

In some embodiments, the spacing (i.e. absolute spacing) between the centers of the antenna elements 308 may be greater or equal to ($\geq$) $\lambda/2$ (i.e. the wavelength requirement divided by 2). The spacing may be measured with units of $\lambda/2$ so that $v(\lambda/2)$ may be the spacing in standard length units. The choice of $\lambda/2$ for the wavelength requirement may be made during the array design process as described below. As shown, in FIG. 3, the antenna elements 308 of the antenna array 302 are spaced apart from each other. The spacing between the antenna elements 308 (differential spacing) of the antenna array may be represented by a differential spacing vector. In some implementations, the differential spacing vector may be expressed as $v=\{v_1\lambda/2, v_2\lambda/2, \ldots, v_{N-1}\lambda/2\}$, where N is the number antenna elements of the antenna array.

Referring still to FIG. 3, the receiver unit 304 of the receiver system 300 receives antenna output signals from the antenna elements 308 of the antenna array 302 and processes the received output signals. As shown, the receiver unit 304 includes a plurality of receivers 322-330. Each of the plurality of receivers 322-330 is coupled to or receives an output signal from a respective antenna element. The receiver unit 304 may coherently sample the incoming signal 301 from the antenna elements around the operating frequency (with period $\lambda$) at a common sample rate required by the bandwidth of the incoming signal 301. The incoming signal 301 sampled by the receiver system 300 may be represented by a received complex signal vector $r_{N\times1}=\{ri(t) i\}=1, 2, \ldots, N$ at each time t.

The processing unit 306 of the receiver system 300 may receive the received complex signal vector $r_{N\times1}$ (e.g., received signals) from the receiver unit 304 and may determine a phase difference between the received signals at the antenna elements. For example, the phase differences of the received signal may be measured or sampled by receiver unit 304 to produce a set of phase differences $\{s_i\}$ corresponding to the incoming signal 301 received by the antenna elements 308. The processing unit 306 may employ a direction finding algorithm to minimize phase ambiguities between the received signals to determine a direction of arrival of the incoming signal 301 relative to the antenna elements 308. In some embodiments, the receiver unit may 304 may produce a received signal vector based on the antenna output signals received from the antenna elements of the antenna array 302.

The processing unit 306 of the receiver system 300 may determine the unambiguous AOA estimate for the incoming signal 301 based on the received complex signal vector $r_{N\times1}=\{ri(t)\}i=1, 2, \ldots, N$ at each time t. Once the processing unit 306 receives the complex signal vector, the processing unit 306 may normalize the phase range of the received signal vector so that each phase lies between $-\frac{1}{2}$ and $\frac{1}{2}$. The processing unit 306 may then compute the phase difference estimate which is equivalent to the angle of arrival estimate. The phase difference estimate may be computed according to the equation $p=\text{angle}(r)/(2\pi)$, where angle( ) denotes the phase of the complex input parameter between $-\pi$ and $\pi$, as for example angle$(Ae_{i\varphi})=\varphi$. The process for computing the AOA estimate is further described below in reference to FIG. 5.

Figure 4:
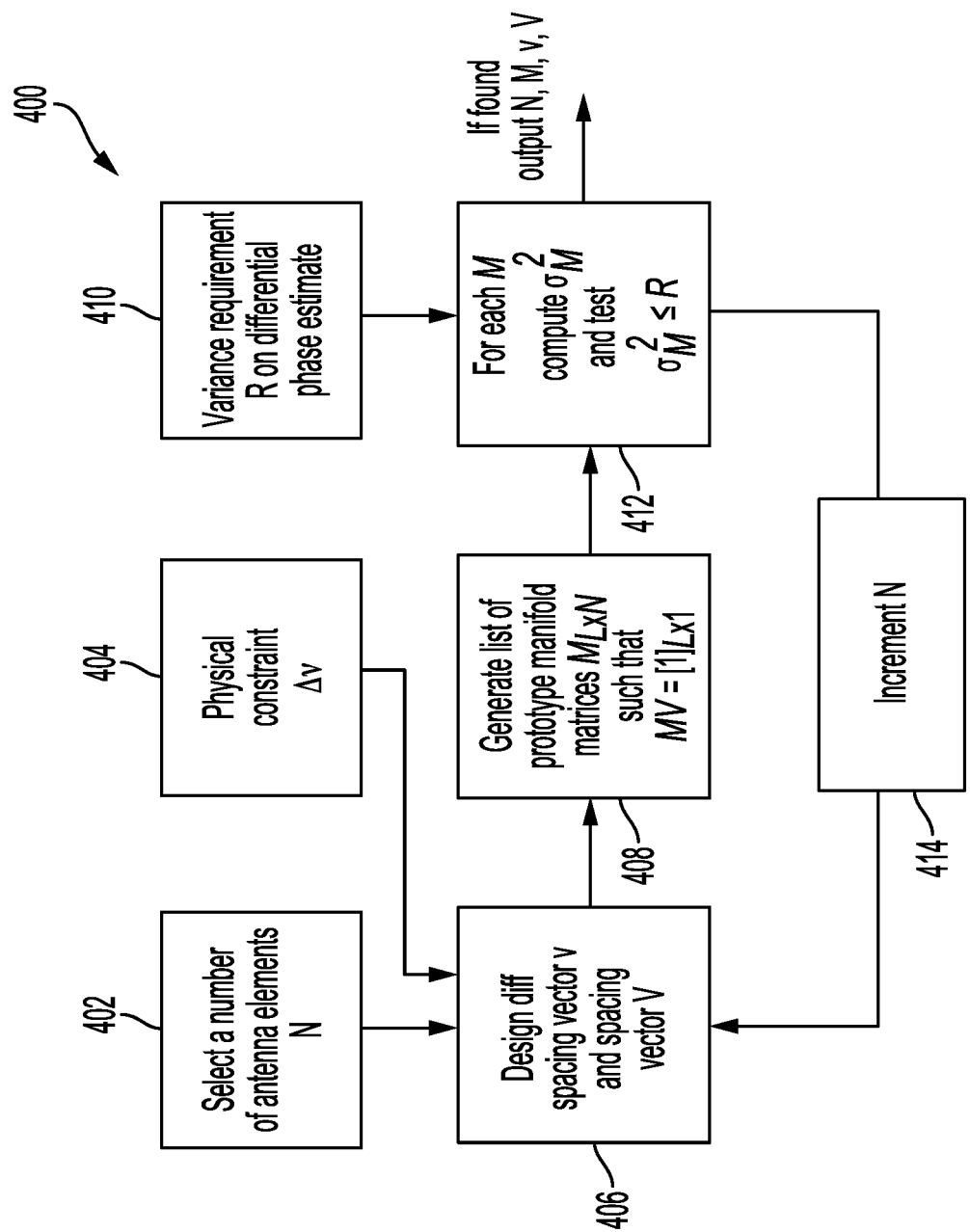
FIG. 4 illustrates of a flow chart of a design process for non-uniform linear antenna arrays, according to an example embodiment.

FIG. 4 illustrates a block diagram of a design process or method 400 for constructing antenna arrays having non-uniform spacing between the array elements (e.g., non-uniform array), according to an example embodiment. The method 400 may include one or more operations, functions, or actions, as depicted by one or more of blocks 402-414, each of which may be carried out by a processor or computing device. The method 400 may be performed in whole or in part by a computing device, such as a device similar to or the same as the processing unit described above.

Those skilled in the art will understand that the method 400 illustrates functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

The antenna array 302 of the receiver system 300 of FIG. 3 may be designed according a non-uniform array approach. The method 400 of a design of an antenna array may begin at block 402. At block 402, the method involves selecting a total number of antenna elements N for the antenna array. For non-uninform arrays, the selected total number of array elements will be at least three to allow for different spacing between the antenna elements of the antenna array.

At block 404, the method involves determining the physical constraints of the antenna array. The physical constraints may include a minimum and/or maximum size of the antenna array, size of the antenna elements, and the spacing between the antenna elements. For example, the computing device may determine the size of the antenna elements of the antenna array and the maximum length of the antenna array. In some embodiments, other system requirements may be determined for the antenna array. For example, an overall desired array differential phase gain G may be determined. This may be the gain in signal to noise performance desired for the antenna array measuring differential phase. For system and full array requirements, a maximum operating frequency f (in Hertz (Hz)) of the antenna array may also be determined with corresponding wavelength c/$\lambda$, where unambiguous differential phase measurements are required.

As block 406, the method involves designing a differential spacing vector (v) and an element position or location spacing vector (V). The differential spacing vector (v) may represent the distances between any two neighboring array elements of the antenna array. The antenna location vector V may represent the locations on an array grid structure where the antenna elements may be place or position. The antenna element locations on the antenna array may be selected according to the spacing distances of an antenna array. For example, the antenna locations may be pre-determined or chosen (by a designer or processor) on the array, which results in the pre-determined element spacing. As such, the computing device may determine the spacing of the antenna elements of the antenna array and the locations of the antenna elements on the antenna based on the number of antenna elements and the physical constraints. For example, for a physical constraint on the minimum array spacing such as vi$\geq\Delta$v, for all i=1, 2, . . . , N−1 and a number of antenna elements N, a differential spacing integer vector vN×1 and a location spacing vector V may be determined that meets the physical constraints. In some embodiments, the computing device may use the set of phase differences to extend the unambiguous phase measurement to a larger range and allow tradeoffs between the noise performance with the unambiguous phase range. It will also be recognized that planar and more general array types may be created using these techniques.

At block 408, the method involves generating a list of potential manifold matrices. The list of potential manifold matrices may be determined based on the differential spacing vector v and the location spacing vector V. Integer differential spacing vectors may be used for simplicity. The computing device may use as input the integer differential spacing vector vN−1×1 (in column form) with corresponding location spacing vector $V_{N\times1}$ and integer matrix $M_{L\times N}$, such that MV=$[1]_{L\times1}$. As an example, let N=4 and $\Delta$v=2 (i.e., the minimum spacing is 2×$\lambda$/2=$\lambda$), using the differential spacing vector v=[3,2,2]=[$\Delta$v+1,$\Delta$v,$\Delta$v] which corresponds to an antenna location vector V=[0,3,5,7], then a virtual spacing of 1 (corresponding to $\lambda$/2) can be formed by, for example, subtracting the second measurement pair 3–2 from the first pair 2–1 (i.e., 3–2=1). This corresponds to computing the expression $$[-1.2, -1.0]\begin{bmatrix} p_1 \\ p_2 \\ p_3 \\ p_4 \end{bmatrix}$$

from the phases of the received incoming signal 301 to get a differential phase estimate of $\lambda$/2 apart. The unambiguous differential phase estimates may be determined in other ways. This results in the matrix:

$$M = \begin{bmatrix} -1 & 2 & -1 & 0 \\ -1 & 1 & 1 & -1 \\ 1 & -3 & 2 & 0 \\ 1 & -1 & -2 & 2 \end{bmatrix}$$

where MV=$[1]_{4\times1}$ and each element of the 4-vector $M_p$ is a differential phase estimate. Note however, modulo 1 may be computed to make sure they all lie between 0 and 1. This gives the final differential phase estimate:

$\Delta\hat{\varphi}$=mean(mod(Mp,1)).

The mean calculation may be performed to avoid artifacts from phase wrap.

At block 410, the method involves determining a variance requirement R for the differential phased estimate. For example, when there is a requirement for a certain AOA accuracy for an antenna array, the requirement may be translated into a differential phase variance requirement. As such, the computing device may determine a differential phase variance requirement for the antenna array. The variance requirement for the differential phase estimate (and hence the performance of the manifold matrix under Gaussian measurement noise with variance $\sigma^2_M$ for the phase estimate p) can be determined by $$\sigma^2_M = \sigma^2_n / N \sum_{j=1}^{N} |\text{column\_sum}(M_{ij})|.$$

In this case, $$\sigma_M^2 = 2\sigma_n^2/4 = \sigma_n^2/2.$$

At block 412, the method involves computing the variance requirement for each M and testing whether $\sigma_M^2 \leq R$. The computing device can determine whether the variance requirement as define by the expression $\sigma_M^2$ meets the differential phase variance requirement. For example, the differential spacing vector may be defined as v=[Δv+1, Δv, ..., Δv], where M is formed by first creating all of the differences from v (e.g., there are N−2 of them), and then creating others using other linear integer relationships between Δv and Δv+1. This may be implemented by searching over integer combinations of integer bases. As such, the L relationships that gives the smallest $\sigma_M^2$ forms the L rows of M.

The computing device can evaluate the performance of the configuration of the antenna elements or the array antenna. If the performance of the array antenna meets the criteria, the computing device may output the number of antenna elements N, the differential spacing vector v, the location spacing vector V, and the manifold matrix $M_{L \times N}$. However, if the performance of the array antenna does not meet the criteria, the computing device can increment the number of antenna elements N at block 404 and proceed to return to block 406. This process may be iterated until an antenna array of appropriate size is found that meets the performance requirements.

In some embodiments, the design can be applied to a Rydberg array for the upper frequencies by using some redundant array elements all operating at one frequency. More particularly, multiple groups of antenna element (e.g., sensors) (each group at one frequency) may be used with appropriate spacing to achieve the no-grating lobe condition across the entire array and across each frequency in the array.

Figure 5:
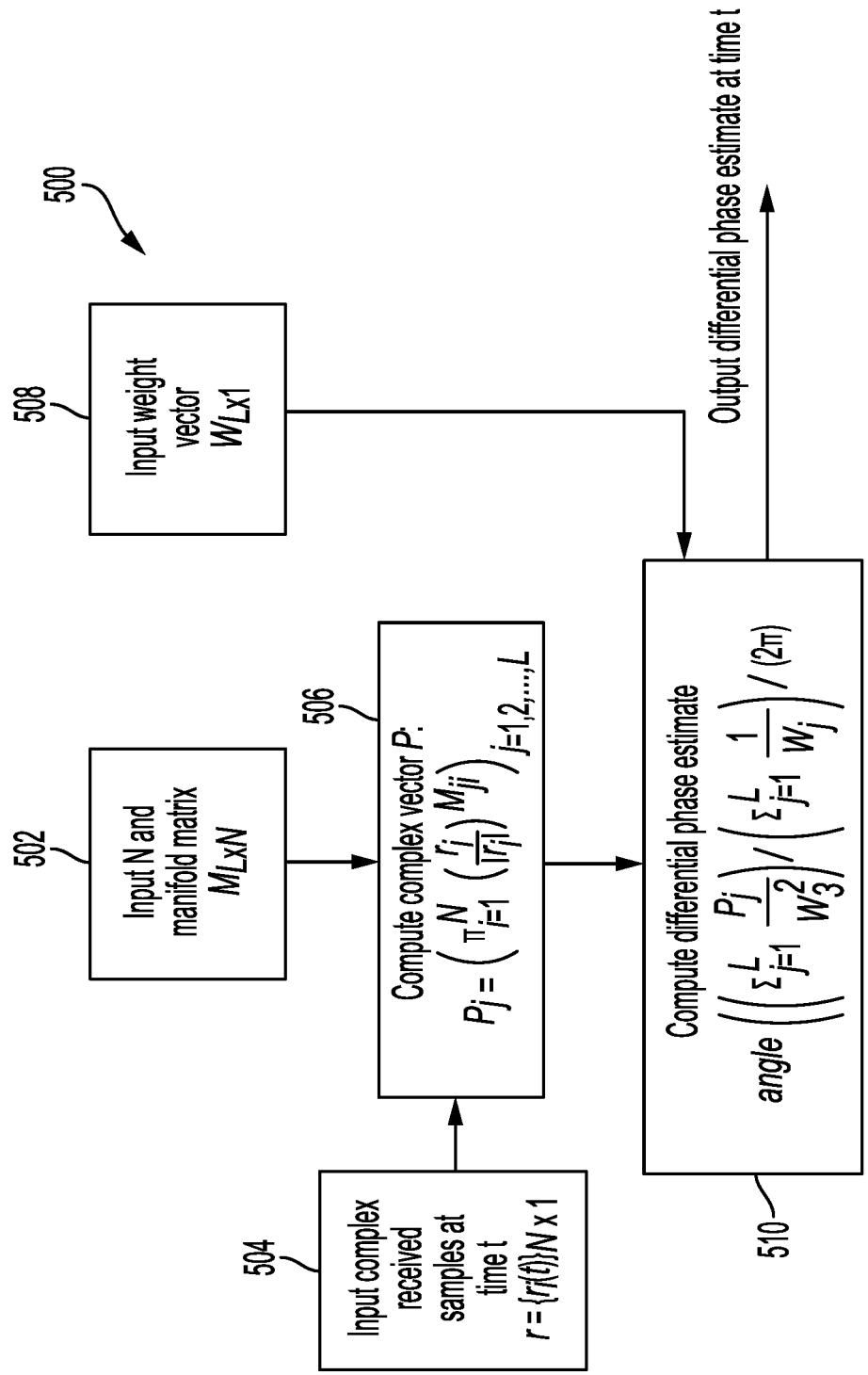
FIG. 5 illustrates a flow chart of the process of estimating an angle of arrival (AOA) of a signal using non-uniform linear antenna arrays, according to an exemplary embodiment.

FIG. 5 illustrates a flowchart of a method 500 for processing a signal using antenna array, according to one or more exemplary embodiments. The method 500 may include one or more operations, functions, or actions, as depicted by one or more of blocks 502-510, each of which may be carried out by any of the apparatus, systems, devices, or method shown in prior figures, among other possible systems. The method 500 may be performed in whole or in part by a computing device, such as a device similar to or the same as processing unit 306 described above.

Those skilled in the art will understand that the method 500 illustrates functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

At 504, the method involves receiving the number of antenna element N and a manifold matrix M. The number of antenna element N and the manifold matrix may be determined during the design process as described above and provided to the computing device.

At 504, the method involves inputting or receiving complex received samples. For example, signals transmitted from a signal source may be received at an antenna array of an antenna system and the antenna system may determine the AOA estimation. The antenna array may include a plurality of antenna elements that receive signals or waves from the environment for subsequent processing. In some embodiments, the signal may include radio communication (RF) signals, such as electrical signals or electromagnetic waves. The antenna elements of the antenna array may receive a phase difference related to the angle of arrival of the incoming signal.

At 506, the method involves computing the complex phase vector P for an incoming signal with wavelength λ. The computing device or processing unit may compute an AOA estimation based on the differential phase estimation using weighting as appropriate to give the best possible estimate as further described below. The signal observed at each antenna element may be used to generate the received signal vector, $r_{N \times 1} = \{ri(t)\}i=1, 2, \ldots, N$ at each time t. For example, the phase difference of the signal observed at each of the antenna elements may be measured and the phase range may be normalized between −½ and ½.

The relationship between a normalized differential phase estimate $\widehat{\Delta\phi}$ constituting the phase difference of arrival between virtual antenna elements λ/2 apart and angle of arrival estimate â is:

$$\hat{a} = \sin^{-1}(2\widehat{\Delta\phi}).$$

The differential phase estimate $\widehat{\Delta\phi}$ can be translated into complex arithmetic so that weighting can be applied. Given the integer AOA manifold matrix $M_{L \times N}$ and complex received samples $r(t)_{N \times 1}$ at time t, L complex numbers $P = \{Pj\}_{L \times 1}$ are computed. As an example, suppose that Δv is the minimum desired spacing in integer λ/2 units and m array elements have interspacings given by [2Δv−1, 2Δv−2, ..., Δv+1, Δv, Δv, ..., Δv]λ/2, then an AOA manifold matrix M can be found such that applying the m received complex values $\{r_i\}$ gives the phase using $$P_j = \left( \prod_{i=1}^{m} \left( \frac{r_i}{|r_i|} \right)^{M_{ji}} \right)_{j=1,2,\ldots,L}$$

At 510, the method involves determining difference phase estimate based on a weight vector. For example, a computing device may determine an unambiguous phase difference estimate, which is equivalent to the angle of arrival estimate, based on a weight vector. Given a weight vector $W_{L \times 1}$ that measures the relative error contribution for each of these L complex numbers $P = \{Pj\}_{L \times 1}$, a normalized differential phase estimate is computed as $$\widehat{\Delta\phi} = \left( \text{angle}\left( \frac{\left( \sum_{j=1}^{L} \frac{P_j}{W_j^2} \right)}{\left( \sum_{j=1}^{L} \frac{1}{W_j^2} \right)} \right) \Big/ 2\pi \right)$$

with the final AOA estimate as:

$$\hat{a} = \sin^{-1}(2\widehat{\Delta\phi}).$$

Figure 6:
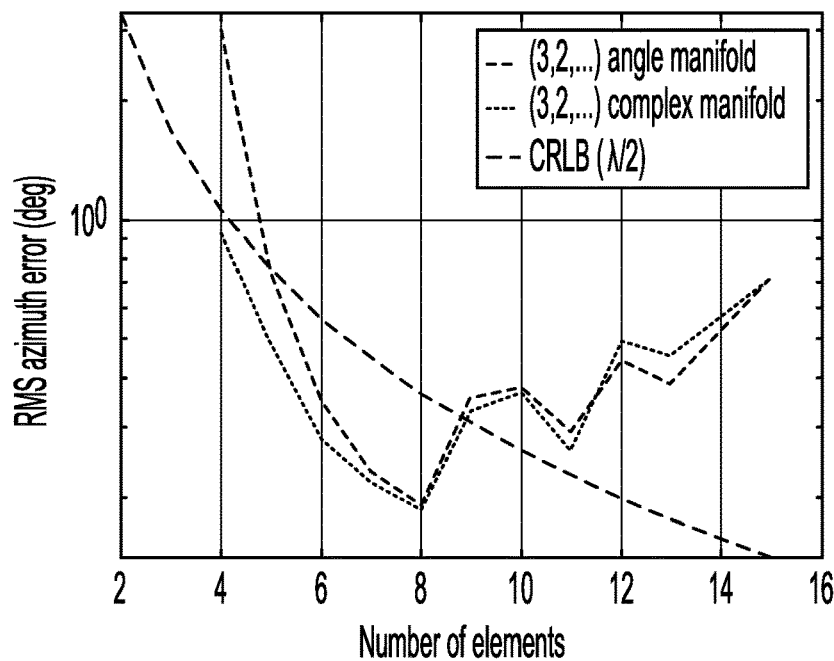
FIG. 6 depicts a graph of a simulation result for the arrival angle estimation of a signal, according to an exemplary embodiment.
Figure 7:
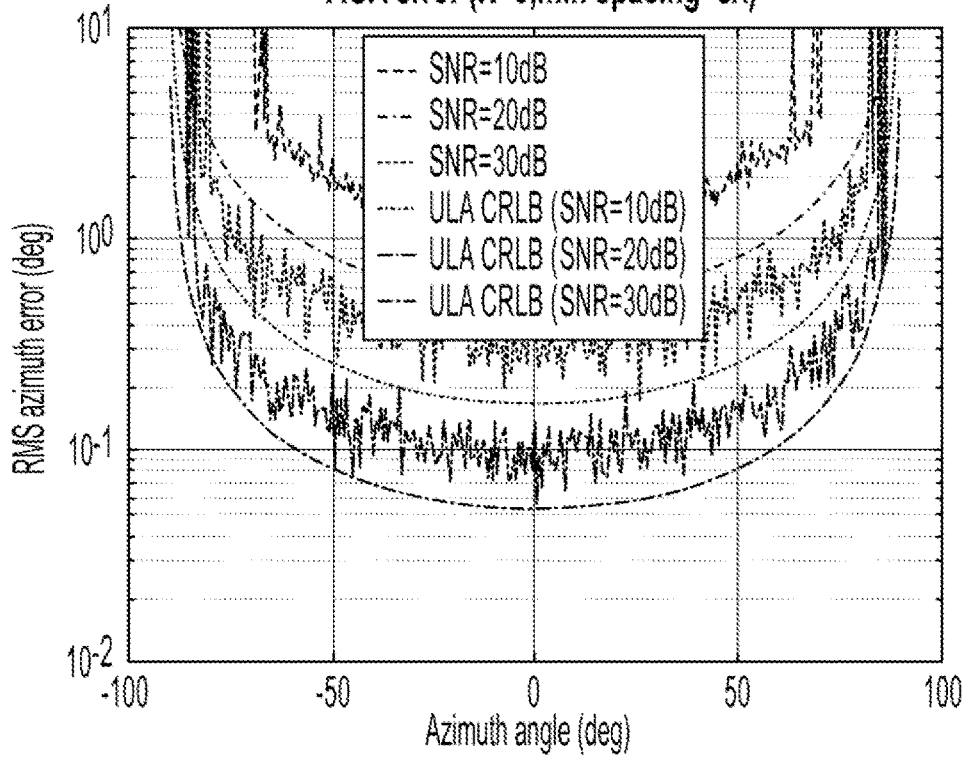
FIG. 7 depicts a graph of a simulation result for an arrival angle estimation of a signal, according to an exemplary embodiment.

FIGS. 6-7 shows simulation results for non-uniform array approaches according to exemplary embodiments. In FIG. 6, a non-uniform array approach was simulation with 9 non-uniform array elements ([3, 2, ..., 2]λ/2) with 1λ minimum spacing (hence at least twice Nyquist). FIG. 6 shows that the angle accuracy of a multi-wavelength or non-uniform array can beat the CRLB for a standard uniform array with the same element count in certain regimes. In FIG. 7, a non-uniform array approach was simulated for a fixed array size (N=9) over the entire azimuth range at three SNRs (10 db, 20 dB and 30 dB) for a different spacing, namely [7, 6, ..., 6]λ/2. FIG. 7 shows that even with 3λ minimum spacing over the entire azimuth range, no angle ambiguities are present and the loss compared to the CRLB is minimal.

In conclusion, the present application relates to improved phased array element structures that solve several problems inherent with conventional uniform linear antenna arrays. The present disclosure allows for wider spacing of elements, while preserving the unambiguous phase information necessary for array processing. This means that much wider bandwidth is possible with unambiguous angle of arrival (AOA) estimation. It allows trade-offs between array gain and grating lobe formation and much smaller length arrays to be used for unambiguous wide-band AOA estimation. Finally, the disclosed method makes possible complex beam forming applications at higher frequencies than was possible before.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for processing high frequency signals comprising:
    receiving, by a receiver system, an incoming signal,
        wherein the receiver system includes an array of antenna elements and a receiver unit associated with each antenna element of the array, and
        wherein the antenna elements are linearly and non-uniformly arranged;
    outputting signals from each of the antenna element of the array to corresponding receiver units of the receiver system;
    determining, by one or more processors associated with the receiver system, a received signal vector based on the signals output from each of the antenna element of the array;
    determining, by the one or more processors, a manifold matrix, wherein the manifold matrix is based on a spacing vector representing positions of the antenna elements of the array;
    determining, by the one or more processors, a phase estimate vector by applying the manifold matrix to values of the received signal vector; and
    estimating, by the one or more processors, an angle of arrival of the incoming signal based on the phase estimate vector and phases of complex input parameters, wherein the phases of the complex input parameters are between $-\pi$ to $\pi$.

2. The method according to claim 1, wherein applying the manifold matrix to the received signal vector comprises combining phase estimates at each antenna element of the array using the manifold matrix, wherein the manifold matrix has a size of L×N, wherein N equals a number of antenna elements, wherein $MV=[1]L_{x1}$, and wherein V is an element spacing vector representing locations of the antenna elements.

3. The method according to claim 1, wherein the antenna elements of the array include:
    a first antenna element; and
    a plurality of antenna elements uniformly spaced apart from one another by a first distance, wherein the plurality of antenna elements includes a second antenna element, wherein the second antenna element is spaced apart from the first antenna element by a second distance, and wherein the second distance is different than the first distance.

4. The method of claim 3, wherein the first distance is greater than or equal to a Nyquist spacing distance or one-half wavelength of an operating frequency of the antenna array.

5. The method of claim 3, wherein the second distance is greater than the first distance.

6. The method of claim 1, wherein the antenna elements of the array include a sensor element.

7. The method of claim 1, wherein the antenna elements of the array include a first antenna element and a remainder of the antenna elements,
    wherein the remainder of the antenna elements are uniformly spaced apart from one another by a first distance,
    wherein the remainder of the antenna elements includes a second antenna element spaced apart from the first antenna element by a second distance that is different than the first distance, and
    wherein the spacing between the remainder of the antenna elements is defined by a differential spacing vector.

8. The method of claim 7, wherein the spacing between the remainder of the antenna elements of the antenna array are equal to integer multiples of λ/2.

9. A method of constructing an antenna array comprising:
    selecting a number of antenna elements for the antenna array;
    determining one or more antenna parameters of the antenna array;
    determining a differential spacing vector (v) representing spacing between the antenna elements of the antenna array based the number of antenna elements and the one or more antenna parameters;
    determining an element spacing vector (V) representing locations of the antenna elements;
    generating manifold matrices based on differential spacing vectors representing spacing between the antenna elements of the antenna array;
    computing a variance value for each manifold matrix of the manifold matrices;
    outputting a spacing vector based on a comparison of the variance value to a threshold value; and
    constructing the antenna array based on the spacing vector.

10. The method according to claim 9, wherein each manifold matrix has a size of L×N, where N equals a number of antenna elements, wherein $MV=[1]L_{x1}$, and wherein V is the element spacing vector.

11. The method according to claim 9, wherein the threshold value includes a difference phase variance value.

12. A system, comprising:
an antenna array including a plurality of antenna elements receiving an incoming signal;
a receiver unit associated with each antenna element of the plurality of antenna elements,
wherein signals are output from the plurality of antenna elements of the array to corresponding receiver units of the system; and
one or more processors configured to:
determine a received signal vector based on signals output from the plurality of antenna elements of the array;
determine a manifold matrix, wherein the manifold matrix is based on a spacing vector representing positions of the plurality of antenna elements of the array;
determine a phase estimate vector by applying the manifold matrix to values of the received signal vector; and
estimate an angle of arrival of the incoming signal based on the phase estimate vector and phases of complex input parameters.

13. The system of claim 12, wherein the plurality of antenna elements includes at least three antenna elements.

14. The system of claim 12, wherein the plurality of antenna elements includes a first antenna element and a remainder of the plurality of antenna elements,
wherein the remainder of the plurality of antenna elements are uniformly spaced apart from one another by a first distance, and
wherein the remainder of the plurality of antenna elements include a second antenna element spaced apart from the first antenna element by a second distance that is different than the first distance.

15. The system of claim 14, wherein the first distance is greater than or equal to a Nyquist spacing distance or one-half wavelength of an operating frequency of the antenna array.

16. The system of claim 14, wherein a spacing between the remainder of the plurality of antenna elements is defined by a differential spacing vector.

17. The system of claim 12, wherein the plurality of antenna elements include a sensor element.

18. The system of claim 12, wherein the phases of the complex input parameters are between $-\pi$ to $\pi$.

19. The system of claim 12, wherein applying the manifold matrix to the received signal vector comprises combining phase estimates at each antenna element using the manifold matrix.

20. The system of claim 19, wherein the manifold matrix has a size of L×N, where N equals a number of antenna elements,
wherein $MV=[1]_{L \times 1}$, and
wherein V is an element spacing vector representing locations of the antenna elements.

* * * * *